US011088535B2

(12) United States Patent
Jacobson et al.

(10) Patent No.: US 11,088,535 B2
(45) Date of Patent: Aug. 10, 2021

(54) FAST GROUND FAULT CIRCUIT PROTECTION

(71) Applicant: RAYTHEON COMPANY, Waltham, MA (US)

(72) Inventors: Boris S. Jacobson, Westford, MA (US); Steven D. Bernstein, Brighton, MA (US)

(73) Assignee: RAYTHEON COMPANY, Waltham, MA (US)

( * ) Notice: Subject to any disclaimer, the term of this patent is extended or adjusted under 35 U.S.C. 154(b) by 227 days.

(21) Appl. No.: 16/382,318

(22) Filed: Apr. 12, 2019

(65) Prior Publication Data

US 2020/0328589 A1    Oct. 15, 2020

(51) Int. Cl.
| | |
|---|---|
| *H02H 7/12* | (2006.01) |
| *H02H 3/10* | (2006.01) |
| *H02H 3/16* | (2006.01) |
| *H02M 1/00* | (2006.01) |

(52) U.S. Cl.
CPC .......... *H02H 7/1213* (2013.01); *H02H 3/105* (2013.01); *H02M 2001/008* (2013.01)

(58) Field of Classification Search
CPC ........ H02H 7/1213; H02H 3/105; H02H 7/12; H02H 3/10; H02H 3/16; H02M 1/32; H02M 3/1588; H02M 7/219; H02M 2001/0074; H02M 2001/0077; H02M 2001/008

See application file for complete search history.

(56) References Cited

U.S. PATENT DOCUMENTS

| | | |
|---|---|---|
| 3,259,802 A | 7/1966 | Steen |
| 3,866,086 A | 2/1975 | Miyoshi et al. |
| 4,081,852 A | 3/1978 | Coley et al. |
| | (Continued) | |

FOREIGN PATENT DOCUMENTS

| | | |
|---|---|---|
| EP | 2006972 A1 | 12/2008 |
| EP | 3012957 A1 | 4/2016 |
| WO | 9012352 A1 | 10/1990 |

OTHER PUBLICATIONS

International Search Report and Written Opinion for International Application No. PCT/US2020/027022; Application Filing Date Apr. 7, 2020; dated Jul. 21, 2020 (17 pages).

(Continued)

*Primary Examiner* — Gary L Laxton
(74) *Attorney, Agent, or Firm* — Cantor Colburn LLP

(57) ABSTRACT

A power converter with ground fault protection (PCGFP) circuit includes an input stage, a first voltage converter, and an output stage. The input stage is connected to a power bus to receive an input direct current (DC) voltage. The first voltage converter converts the input DC voltage to a second voltage and switches between an open and closed state to regulate power present on the power bus. The output stage includes a second voltage converter circuit to generate an output voltage having a different voltage level from the input DC voltage. A controller controls operation of the first and second voltage converters and is also capable of detecting a ground fault on the power bus. The controller operates the first and second voltage converts in a fault isolation mode in response to detecting the ground fault such that the first and second voltage converters isolate the ground fault.

15 Claims, 5 Drawing Sheets

(56) References Cited

U.S. PATENT DOCUMENTS

| | | |
|---|---|---|
| 4,494,100 A | 1/1985 | Stengel et al. |
| 4,510,915 A | 4/1985 | Ishikawa et al. |
| 4,613,843 A | 9/1986 | Esper et al. |
| 4,748,532 A | 5/1988 | Commander et al. |
| 4,890,083 A | 12/1989 | Trenkler et al. |
| 4,931,894 A | 6/1990 | Legatti |
| 5,039,964 A | 8/1991 | Ikeda |
| 5,224,006 A | 6/1993 | MacKenzie et al. |
| 5,431,987 A | 7/1995 | Ikeda |
| 5,502,430 A | 3/1996 | Takahashi et al. |
| 5,579,202 A | 11/1996 | Tolfsen et al. |
| 5,592,089 A | 1/1997 | Danby et al. |
| 5,661,623 A | 8/1997 | McDonald et al. |
| 5,844,451 A | 12/1998 | Murphy |
| 5,982,593 A | 11/1999 | Kimblin et al. |
| 6,023,161 A | 2/2000 | Dantsker et al. |
| 6,101,073 A | 8/2000 | Takehara |
| 6,421,214 B1 | 7/2002 | Packard et al. |
| 6,490,176 B2 | 12/2002 | Holzer et al. |
| 6,501,364 B1 | 12/2002 | Hui et al. |
| 7,191,007 B2 | 3/2007 | Desai et al. |
| 7,378,817 B2 | 5/2008 | Calhoon et al. |
| 7,471,986 B2 | 12/2008 | Hatlestad |
| 8,097,983 B2 | 1/2012 | Karalis et al. |
| 8,102,235 B2 | 1/2012 | Hui et al. |
| 8,476,788 B2 | 7/2013 | Karalis et al. |
| 2010/0231284 A1* | 9/2010 | Jacobson ............... H02H 9/08 327/307 |

OTHER PUBLICATIONS

Cheng et al., "Design and Loss Analysis of Loosely Coupled Transformer for an Underwater High-Power Inductive Power Transfer System," in IEEE Transactions on Magnetics, vol. 51, No. 7, Jul. 2015, Article No. 8401110 (10 pages).

Kan et al., "A Three-Phase Wireless Charging System for Lightweight Autonomous Underwater Vehicles", APEC 2017, pp. 1407-1411.

Shi et al., "Design and analysis of an underwater inductive coupling power transfer system for autonomous underwater vehicle docking applications," Journal of Zhejiang University Science C., vol. 15, No. 1, Jan. 2014, pp. 51-62.

* cited by examiner

US 11,088,535 B2

FAST GROUND FAULT CIRCUIT PROTECTION

BACKGROUND

The present invention relates to power distribution systems, and more specifically, high-power distribution systems implementing fault circuit protection.

Many known electrical power and distribution systems include circuit breakers configured to completely interrupt current flowing between two points of the system in response to a circuit fault condition such as, for example, a short-circuit condition. Moreover, electromechanical circuit breakers typically take milliseconds to respond to short-circuit fault conditions. Emerging solid-state circuit breakers, therefore, often utilize semiconductor devices such as insulated-gate bipolar transistors (IGBTs), for example, to completely interrupt the current flowing through the circuit.

SUMMARY

According to a non-limiting embodiment, a power converter having ground fault protection (PCGFP circuit) is provided. The PCGFP circuit comprises an input stage, a first voltage converter, and an output stage. The input stage is connected to a power bus and is configured to receive an input direct current (DC) voltage having a first voltage level. The first voltage converter is connected to the power bus and is configured to convert the input DC voltage to a second voltage having a second voltage level different from the first voltage level. The first voltage converter includes a plurality of solid-state switches configured to continuously switch between an open and closed state at a selected frequency so as to regulate power present on the power bus. The output stage is connected to the power bus and includes a second voltage converter circuit configured to rectify the second voltage to generate an output voltage having a different voltage level from the first level. A controller is configured to control operation of the first and second voltage converters and to detect a ground fault on the power bus. The controller can operate one or both of the first voltage converter and the second voltage converter in a fault isolation mode in response to detecting the ground fault, wherein one or both of the first voltage converter and the second voltage converter isolates the ground fault in response to operating in the fault isolation mode.

According to another non-limiting embodiment, a power distribution system comprises a power amplifier, at least one sensor, at least one power converter having ground fault protection (PCGFP circuit), and a controller. The power amplifier is electrically coupled to a power bus and is configured to receive a DC input and to provide floating DC outputs to the power bus. The least one sensor is configured to monitor operating parameters of the power bus. The at least one PCGFP circuit is configured to capture and store fault energy delivered in response to a ground fault on the power bus. The controller is configured to operate the at least one PCGFP circuit in a normal mode to regulate power on the power bus, and a fault isolation mode to isolate the ground fault occurring on the power bus.

According to yet another non-limiting embodiment, a method of interrupting an electrical ground fault comprises delivering, via a power bus, an input direct current (DC) having a first voltage level to an input stage, and converting, via a first voltage converter connected to the power bus, the input DC voltage to a second voltage having a second voltage level different from the first voltage level. The method further comprises continuously switching a plurality of solid-state switches included with the first voltage converter including a plurality of solid-state switches so as to regulate power present on the power bus, and rectifying, via an output stage connected to the power bus, the second voltage to generate an output voltage having a different voltage level from the first level. The method further comprises detecting, via a controller, a ground fault on the power bus; and operating one or both of the first voltage converter and the second voltage converter in a fault isolation mode in response to detecting the ground fault so as to isolate the ground fault.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Disclosed herein are embodiments of a single power processing unit combining functions of DC bus regulation and ground fault protection. The power processing unit is based on a Power Converter with Ground Fault Protection (PCGFP).

The embodiments herein are based on a general construct that includes a High Frequency (HF) power converter topology that speeds up the dynamic response time to the microseconds range.

Conventional ground fault interrupt devices have low speed. Even fast solid state circuit breakers take milliseconds to isolate faults while adding dedicated solid state circuit breakers to the system reduces efficiency. Energy released into the fault is dissipated in the structure and can't be recovered. Another shortcoming of conventional devices is that oscillation of the bus voltage caused by a ground fault isn't damped.

Various non-limiting embodiments described herein provide power converter circuit having ground fault protection, hereinafter referred to as a "PCGFP circuit." The PCGFP circuit implements a power processing unit that combines functions of direct current (DC) bus regulation and ground fault protection. The PCGFP circuit utilizes a high frequency (HF) power topology to speed up the response time to the microseconds range, which improves the ground fault response time (e.g., by ten times) compared to conventional solid state circuit breaker architectures. The PCGFP can operate in a normal mode to regulate power present on the power bus, and a fault isolation mode to quickly isolate a ground fault occurring on the power bus.

The PCGFP described herein also provides fault energy recovery capabilities. For example, the PCGFP is capable of capturing and storing fault energy in one or more storage units (e.g., one for input and/or one for the output). When the fault is cleared, for example, the stored energy is available for reuse. Accordingly, the PCGFP can be employed in a power distribution system and can vary the system impedance by controlling the release of stored fault energy. In one example, the stored energy can be drawn and released on the bus to vary the bus impedance and dampen oscillation of the system.

Figure 1:
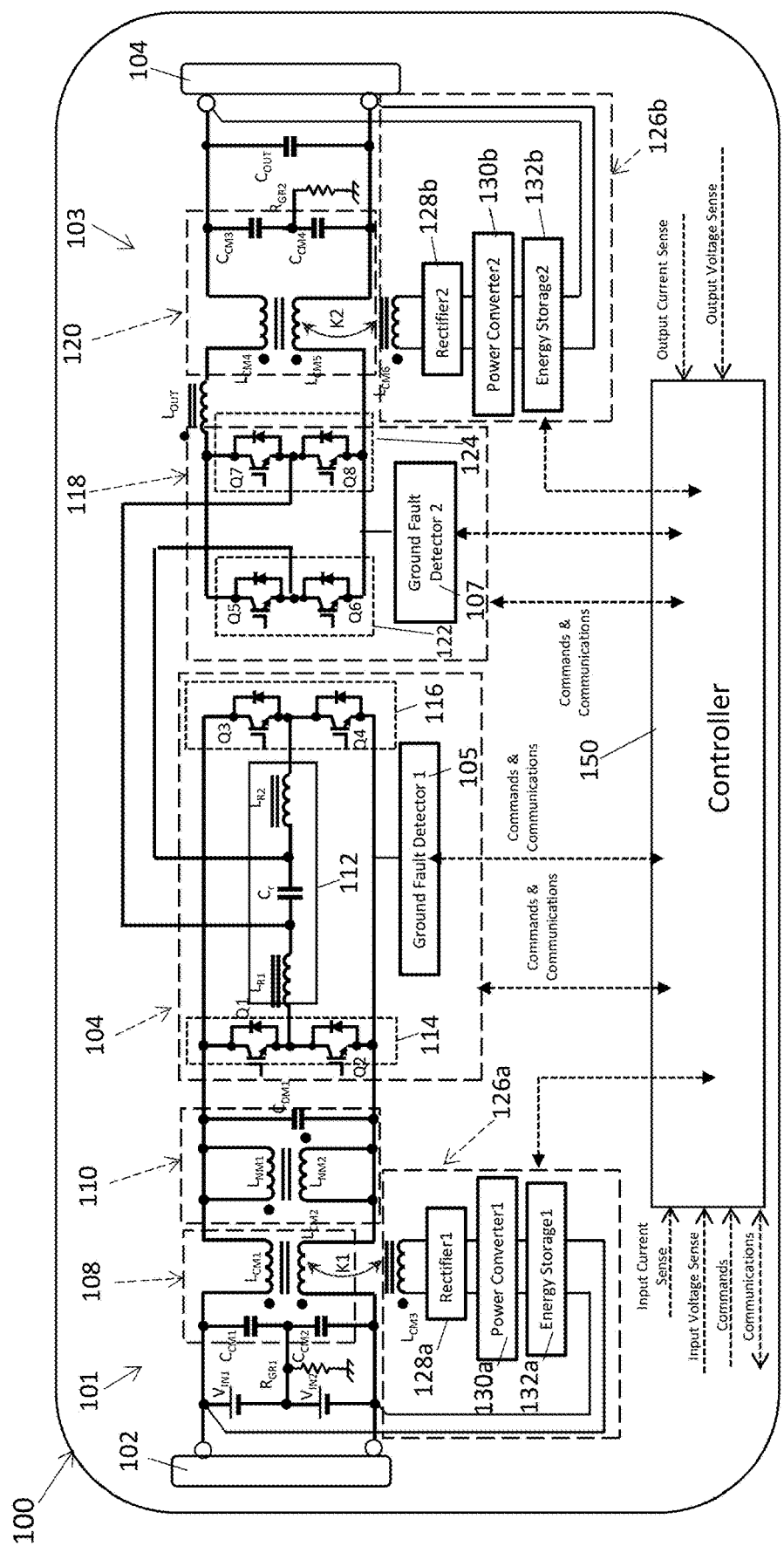
FIG. 1 is a schematic diagram of a power converter circuit according to a non-limiting embodiment.

With reference now to FIG. 1, a power converter circuit 100 having ground fault protection ("PCGFP circuit" 100) is illustrated according to a non-limiting embodiment. The PCGFP circuit 100 includes an input stage 101 and an output stage 103. The input stage 101 is connected between a prime power voltage source 102 and a primary power converter 104. The output stage 103 is connected between the primary power converter 104 and one or more electrical loads 106. A first ground fault detector 105 (e.g., a sensor) is provided to monitor the power bus at the input stage 101. A second ground fault detector 107 (e.g., a sensor) is provided to monitor the power bus at the output stage 103.

The input stage 101 includes an input common-mode filter 108 and an input normal-mode filter 110. The input common-mode filter 108 is connected between the prime power voltage source 102 and the input normal-mode filter 110. Accordingly, the input common-mode filter 108 is configured to filter noise (e.g., noise current) that passes through ground and returns to the voltage source 102. The input normal-mode filter 110 is connected between the output of the common-mode filter 108 and the input of the primary power converter 104. Accordingly, the input normal-mode filter 110 filters noise (e.g., electromagnetic interference) across the voltage source 102, and outputs the filtered voltage signal to the primary power converter 104.

The primary power converter 104 operates to convert the prime input voltage from a first DC voltage to a second DC voltage different from the first DC voltage. The first voltage (i.e., the prime power voltage) can range, for example, from about 800 volts DC to about 1200 volts DC. The second voltage can range, for example, 450 volts DC to about 650 volts DC. The In one or more embodiments, the primary power converter 104 is constructed as a parallel resonant converter that includes a resonant tank circuit 112 and a plurality of primary switching units Q1-Q4.

The resonant tank circuit 112 includes a resonant capacitor Cr interposed between a first winding Lr1 and a second winding Lr2. The first and half windings Lr1 and Lr2 can have an inductance of approximately 2.5 microhenries (pH) for example.

The plurality of primary switching units (Q1-Q4) may be formed as semiconductor devices, such as a field effect transistor (FET), and may include a first set of FETs Q1, Q2, and a second set of FETs Q3, Q4 to form a primary H-bridge circuit. The first set of FETs Q1, Q2 form a first leg 114 of the primary H-bridge circuit, and the second set of FETs Q3, Q4 for a second leg 116 of the primary H-bridge circuit. One end of the first winding Lr1 is connected to the source of FET Q1 and the drain of the FET Q2, while the opposite end of the first winding Lr1 is connected to a first end of the resonant capacitor Cr. One end of the second winding Lr2 is connected to the opposite end of the resonant capacitor Cr, while the opposite end of the second winding Lr2 is connected to the source of FET Q3 and the drain of the FET Q4. Each vertical leg, i.e., segment, of the H-bridge is selectively controlled via a respective FET among the plurality of FETs (Q1-Q4). The voltage across resonant capacitor Cr is delivered to the output stage 103 where it is converted into an output voltage that is delivered to the load 104 The output stage 103 includes a secondary converter 118 and an output common-mode filter 120. The secondary converter 118 can operate to rectify the second voltage delivered by the primary power converter 104. In one or more embodiments, the secondary converter 118 includes a first leg 122 including a first set of switches Q5 and Q6, and a second leg 124 including a second set of switches Q7 and Q8. Switches Q5 and Q6 are connected to one another via a first shared source/drain terminal. Similarly, switches Q7 and A8 are connected to one another via a second shared source/drain terminal. The switches Q5, Q6, Q7 and Q8 can be formed, for example, as semiconductor devices, such as a field effect transistor (FET). The first shared source/drain terminal is connected to the first end of the resonant capacitor Cr, which is also connected to the first winding Lr1. The second shared source/drain terminal is connected to the opposing end of the resonant capacitor Cr, which is also connected to the second winding Lr2. Accordingly, the rectified voltage generated by the secondary converter 118 is delivered to the common-mode filter 120.

The output common-mode filter 120 operates similar to the input common-mode filter. Accordingly, the output common-mode filter 120 is configured to filter noise (e.g., noise current) that passes through ground at the output stage 103.

The first stage 101, primary power converter 104, and second stage 103 are each in signal communication with an electronic hardware controller 150. The controller 150 can operate to control the switching of the primary FETs (Q1-Q4) and the secondary FETs (Q5-Q8). In one or more embodiments, the controller 150 can drive the primary FETS (Q1-Q4) and the secondary FETs (Q5-Q8) at a fixed high-frequency ranging, for example (400 kHz to 4,000 kHz) The controller 150 can also perform phase-shift modulation (PSM) to generate a first phase-shift angle $\phi 1$, which is applied to the primary FETs (Q1-Q4). Accordingly, the second converter 118 can employ a feed-forward PSM derived from the second voltage provided by primary power converter 104 to generate the second phase-shift angle $\phi 2$.

In one or more embodiments, the controller 150 can generate one or more converter control signals that drive the primary converter unit 102 and the second converter 118. The controller can include a digital pulse-width modulator and/or a digital phase-shift modulator to generate pulsed waveforms that control the FETs Q1-Q8 at a targeted duty ratio and targeted phase-shift angles. For example, the controller 150 can generate a first pulse waveform that drives FETS Q1-Q4 at a duty cycle according to the first phase-shift angle $\phi 1$, and can generate a second pulse waveform that drives FETS Q5-Q8 at a duty cycle according to the second phase-shift angle $\phi 2$. The controller 150 can also generate one or more rectifier control signals that drive the second converter 118 according to the second phase-shift angle $\phi 2$.

In one or more embodiments, the controller 150 is configured to determine a ground fault on the power bus based on the measurements provided by the first ground fault detector 105 and/or second ground fault detector 107. In response to determining a ground fault is present, the controller can operate the primary converter unit 102 and/or the second converter 118 in a fault isolation mode. In response to initiating the fault isolation mode, the primary converter unit 102 and/or the second converter 118 can quickly isolate the ground fault (e.g., within 5 microseconds to 50 microseconds).

Still referring to FIG. 1, the PCGFP circuit 100 can include one or more fault energy recovery circuits 126a and 126b, which are configured to capture and store fault energy in one or more storage units (e.g., one for the input stage 101 and/or one for the output stage 103). When the fault is cleared, for example, the stored energy is available for reuse. In one example, the stored energy can be drawn and released to vary the bus impedance and dampen oscillation of a power distribution employing the PCGFP circuit 100.

A first fault energy recovery circuit 126a (i.e., an input fault energy recovery circuit 126) is installed at the input stage 101 of the PCGFP circuit 100, while a second fault energy recovery circuit 126b (i.e., an output fault energy recovery circuit 126b) is installed at the output stage 103. The input fault energy recovery circuit 126a includes an additional winding $L_{CM3}$ of the inductor coupled to the other inductor winding with a coupling factor K1, a first rectifier 128a, a first power converter 130a, and a first energy storage device 132a. The output fault energy recovery circuit 126b includes a second rectifier 128b, a second power converter 130a, and a second energy storage device 132a. The input fault energy recovery circuit 126a and output fault energy recovery circuit 126b operate in a similar manner. Therefore, operation of only the input fault energy recovery circuit 126a will be described below for the sake of brevity.

In response to a ground fault event, fault energy (μl) in the input common-mode filter 108 is transferred to winding $L_{CM3}$, which induces a first fault voltage. The first fault voltage is delivered to the rectifier 128a, which converts it from AC to DC._. The first rectifier 128 can be constructed, for example, as a bridge rectifier circuit. The rectified fault voltage is delivered to the first power converter 130a, which operates as a bridge rectifier employing an isolation transformer and four fully-controllable switches (i.e., transistors) to step the voltage up or down as needed for the interface to the bus The converted fault voltage is output to the energy storage device 132, where it is stored and made available for reuse.

Figure 2:
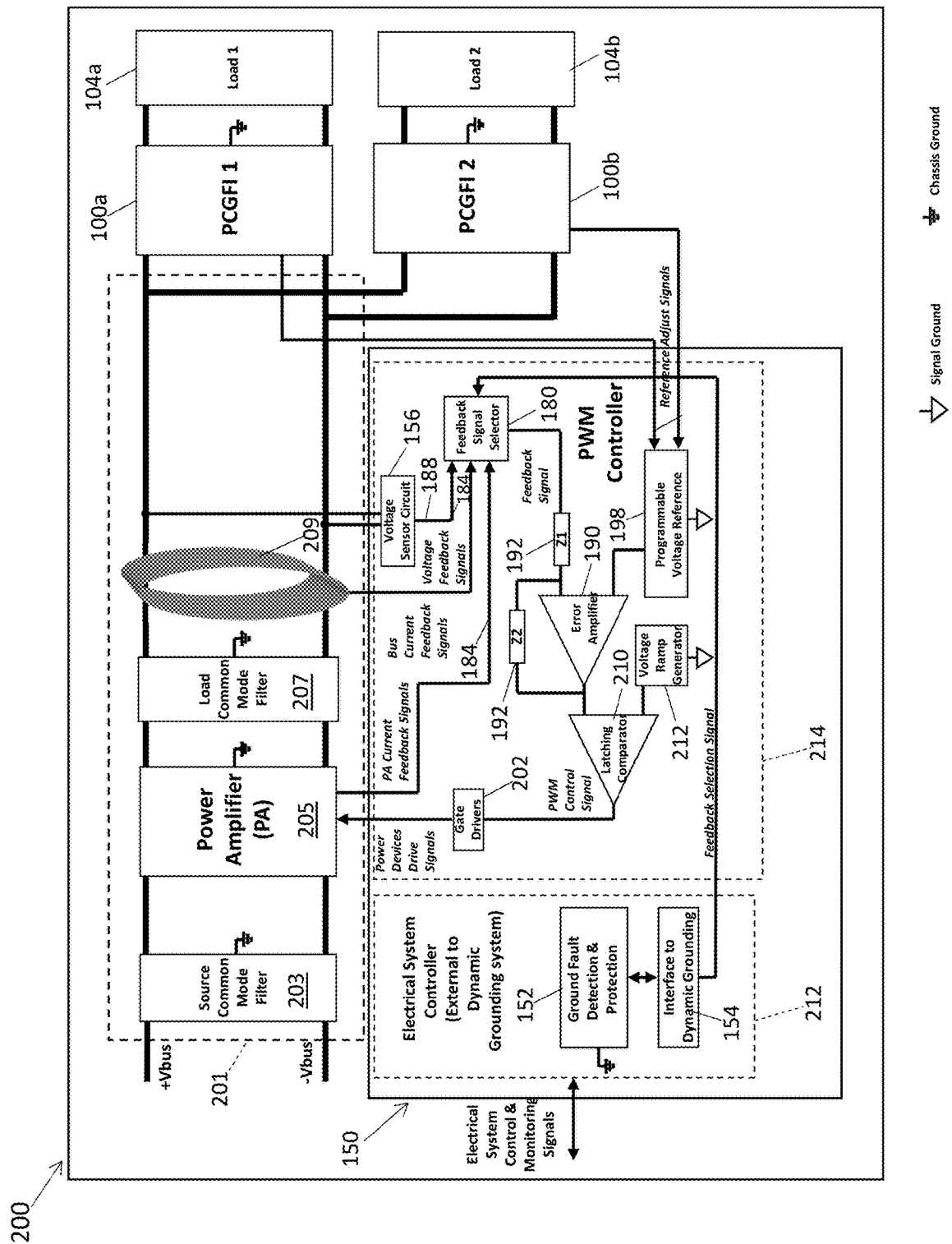
FIG. 2 is a block diagram of a power distribution system including a power converter circuit of FIG. 1 according to a non-limiting embodiment.

Turning now to FIG. 2, a power distribution system 200 is illustrated according to a non-limiting embodiment. The power distribution system 200 includes one or PCGFP circuits 100a, 100b connected to a power bus 202. Each PCGFP circuits 100a, 100b operates as described above (with reference to FIG. 1) to deliver power from the power bus 202 to a respective load 104a, 104b. Although two PCGFP circuits 100a, 100b are illustrated, it should be appreciated that additional PCGFP circuits 100n can be implemented without departing from the scope of the invention.

The power bus 201 includes a source common-mode bus filter 203, a power amplifier 205, and a load common-mode bus filter 207. In at least one embodiment, any number of PCGFP circuits 100a, 100b, 100n can coordinate their operation with any number of power amplifiers 205 in the system. The power distribution system 200 also includes one or more sensors such as a common-mode bus current sensor 209, a voltage sensor circuit 156, and a controller 158. The source common mode filter 164 which submits a floating DC bus, +V bus, and −Vbus to the power amplifier 205.

The power distribution system 200 further includes controller 150 that implements a ground fault detection unit 212 and a pulse width modulation (PWM) unit 214. Any one of the ground fault detection unit 212 and the PWM unit 214 can be constructed as an electronic hardware controller that includes memory and a processor configured to execute algorithms and computer-readable program instructions stored in the memory. In one or more embodiments, the power distribution system 200 can operate as a dynamic grounding system capable of detecting an imbalance in the DC outputs and driving the power amplifier 206 to re-balance the floating DC outputs, suppress transients, and suppress bus oscillations.

The ground fault detection unit 212 processes electrical system control and monitoring signals from all zones and includes a ground fault detection and protection circuit 152 as well as an interface to dynamic grounding 154. In one or more embodiments, the ground fault detection and protection circuit 152 can determine a ground fault based on measurements output from one or more sensors (e.g., the first ground fault detector 105 and the second ground 107) included in the PCGFP circuits 100a and 100b. In response to determining a ground fault, the ground fault detection and protection circuit 152 can generate a ground fault signal, which is delivered to the PWM unit 214 via the interface to dynamic grounding 154.

The PWM unit 214 includes a feedback signal selector 180 which in response to the signal from interface dynamic grounding 178, the power amplifier current feedback signals on lines 182, and the power amplifier current feedback signals on line 184, selects either the current sensor circuit input on line 186 or the voltage sensor circuit input on line 188. Whichever signal is selected is delivered to error amplifier 190 which has associated with it an input impedance 192 and feedback impedance 194. Error amplifier 190 detects the presence of an imbalance between floating DC buses 166 and 168 by comparing the sensor input on line 196 from feedback selector 180 with a voltage reference 198. The error signal is transmitted to switching function generator 200 which may for example be a pulse width modulation (PWM) circuit, a phase shift control (PSC) circuit, a frequency modulation control (FMC) or a hysteretic control also known as a bang-bang (B-B) circuit. Whichever means is used to generate the switching function the ultimate switching functions are delivered to gate drivers 202 which then drive the appropriate gates in power amplifier 152 to generate the compensation signals to compensate for the imbalance in the floating DC output buses 166 and 168.

Figure 3:
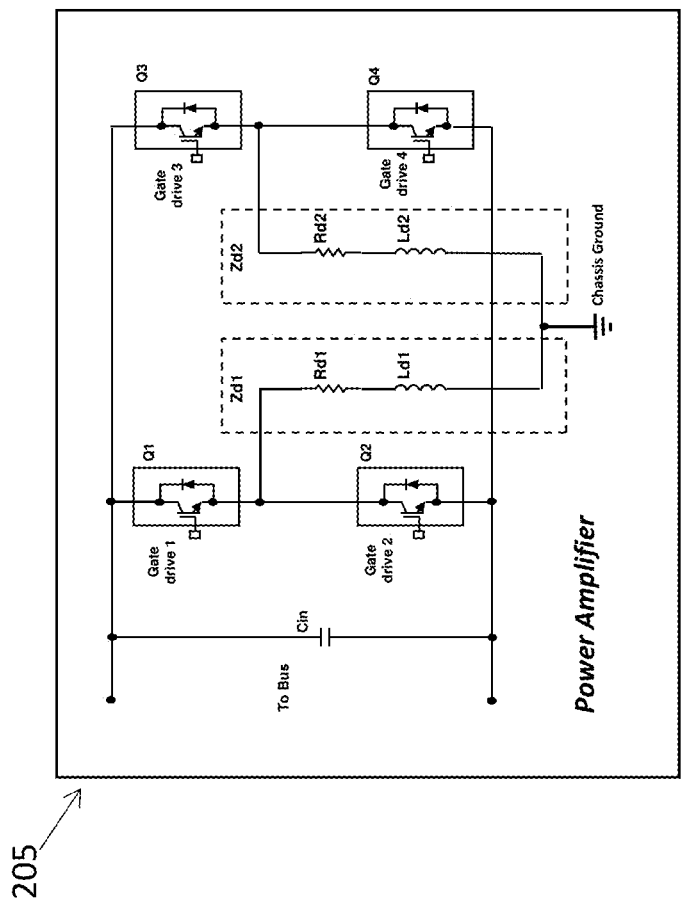
FIG. 3 is a schematic diagram of a power amplifier circuit included in the power distribution system of FIG. 2 according to a non-limiting embodiment.

FIG. 3 illustrates an example of a power amplifier 205 capable of being implemented in the power distribution system 200 described above. The power amplifier 205 includes two bridge legs 220 and 222. The first bridge leg 220 includes a first switching device 224 including semiconductor Q1 and a second switching device 226 including semiconductor Q2. The two are connected in series between floating DC buses 166 and 168, for example, which are provided with an input capacitor 228. A grounding damping impedance 230 is connected at node 232 where the two switching circuits 224, 226 are connected together. The other end of grounding impedance 230 is connected to ground 234 which is chassis ground. Grounding impedance 230 may include a resistance 236 or it may include resistance 236 and an inductance 238. Second bridge leg 222 and subsequent bridge legs may be constructed in the same fashion.

The signals for operating switches 224 and 226 can be provided by a gate driver. The gate signal can allow for closing switch 224 when switch 226 is open, and vice versa. For the second bridge, switch 225 and switch 227 can be operated in a similar manner. Also, the phasing of switches 225 and 227 can operate in synchronism in opposite phase to signals 224 and 226. Thus when switch 224 is closed current is flowing from bus 166 through switch 224 to grounding impedance 230 and ground 234 and current is flowing from ground 234 through grounding impedance 230a and through switch 227. In the next period current flows through switch 225 through grounding impedance 230a to ground 234 and from ground 234 through grounding impedance 230 through switch 226 to bus 168.

Figure 4:
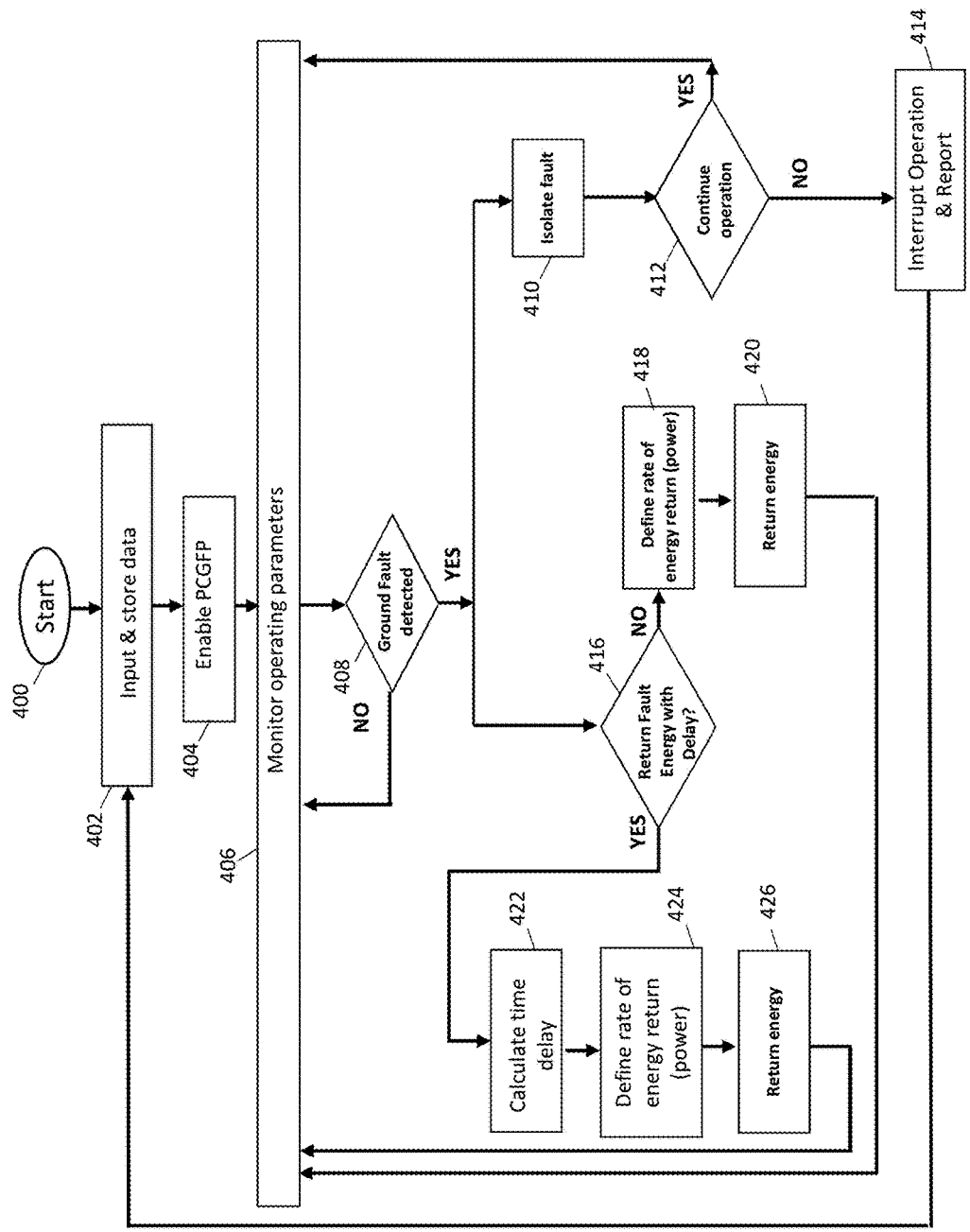
FIG. 4 is a flow diagram illustrating a method of interrupting an electrical ground fault according to a non-limiting embodiment.

Turning now to FIG. 4, a method of illustrating a method of interrupting an electrical ground fault is illustrated according to a non-limiting embodiment. The method begins at operation 400 and receives input data at operation 402. The input data include, but are not limited to the ground fault threshold and the trip range, nominal load power and its range, nominal input and output voltages and their ranges as well as the upper limits on the bus long-term and transient voltage deviations from the chassis ground. At operation 404, the PCGFP circuit is enabled, and operating parameters of the PCGFP circuit are monitored at operation 406. The operating parameters include, but are not limited to, input current, input voltage, output current and output voltage. At operation 408, a determination is made as to whether a ground fault has occurred based on the monitored operating parameters. When a ground fault has not occurred, the method returns to operation 406 and continues monitoring the operating parameters.

When, however, a ground fault has occurred the PCGFP isolates the fault at operation 410 by inhibiting operation of all semiconductor switches. . . . At operation 412, a determination is made as to whether to continue operation. When for example, the top-level system requires continued operation in the event of a single ground fault, the PCGFP continues operation and sends a warning. When the top-level system doesn't requires continued operation in the event of a single ground fault, the PCGFP shuts down the load and sends a warning. When the system proceeds to continue operation, the method returns to operation 406 and continues monitoring the operating parameters. When, however, the system proceeds to halt operation, the system is interrupted at operation 414 and a system report is generated. The system report can include, for example, the values of the monitored parameters at the time the ground fault was detected. The system report can then be stored (e.g., in a controller) for subsequent analysis.

When a ground fault is detected at operation 408, an operation capturing and storing the ground fault energy can also be performed. At operation 416, a determination is made whether to return the fault energy with a delay or without a delay. In one or more embodiments, the, decision can be specific to a given power system and forms a part of the top-level requirements built into the control algorithm. When there is no call for a delay, the a rate of energy return (e.g., an amount of power) is determined at operation 418 In one or more embodiments, the decision can be based in part on the rate of the energy transfer is specific to a given power system and forms a part of the top-level requirements built into the control algorithm. At operation 420, the energy is returned (e.g., the fault energy is injected to the power bus at the determined return rate, and the method returns to operation 406 to continue monitoring the operating parameters.

When, however, there is a call to return the fault energy with a delay, a time delay is calculated (e.g., by controller 150) at operation 422 and the rate of energy return is determined (e.g., by controller 150) at operation 424. At operation 426, the energy is returned at the determined return rate, and the method returns to operation 406 to continue monitoring the operating.

Figure 5:
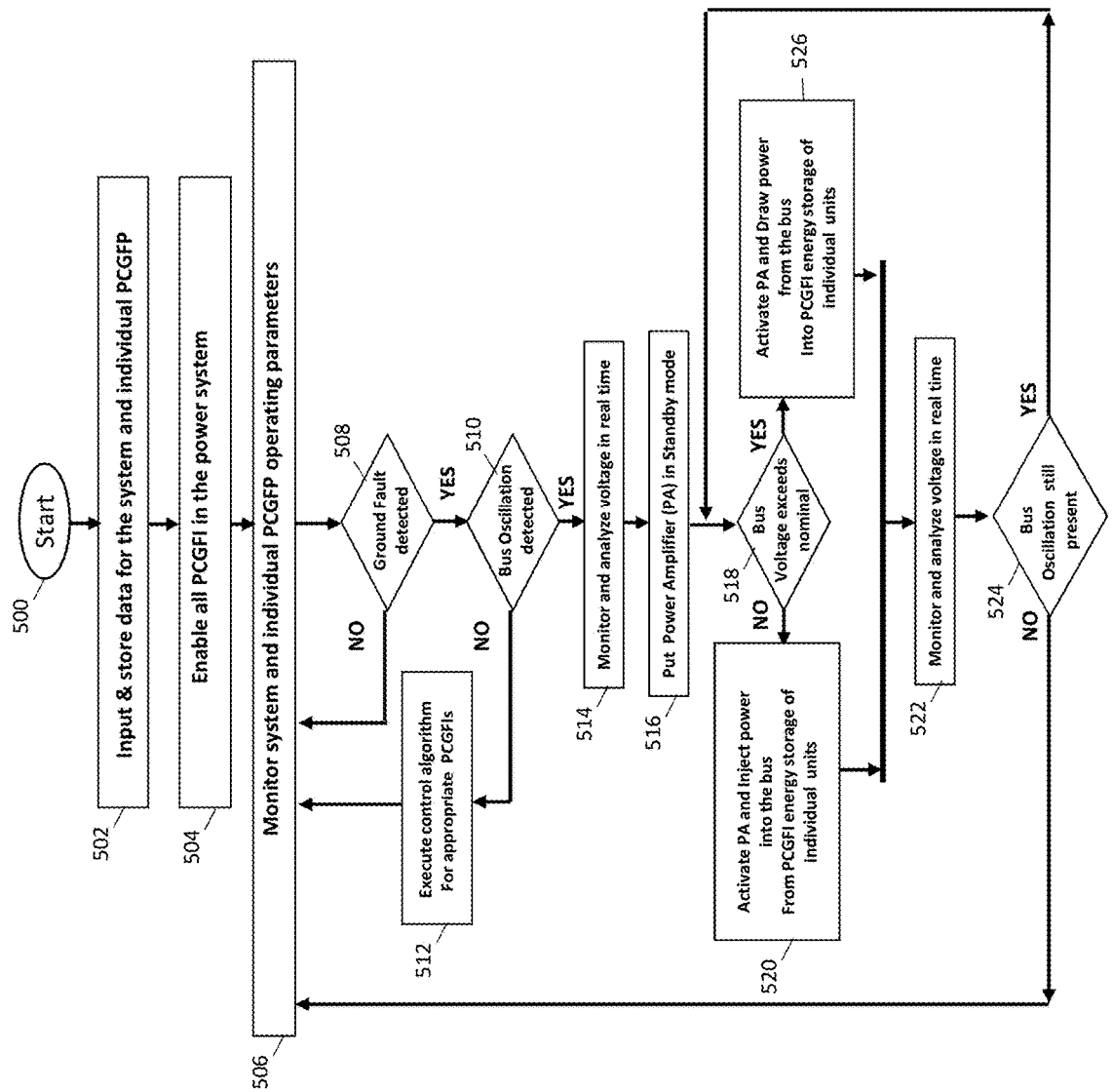
FIG. 5 is a flow diagram illustrating a method of suppressing bus oscillation in a power distribution system according to a non-limiting embodiment.

Referring to FIG. 5, a method of suppressing bus oscillation in a power distribution system is illustrated according to a non-limiting embodiment. The method begins at operation 500, and receives input data at operation 502. The input data corresponds to the power distribution system, along with one or more PCGFP circuits employed in the power distribution system. At operation 504, all the PCGFP circuits employed in the power distribution system are enabled, and operating parameters of each individual PCGFP circuit is monitored at operation 506. At operation 508, a determination is made as to whether a ground fault has occurred based on the monitored operating parameters. When a ground fault has not occurred, the method returns to operation 506 and continues monitoring the operating parameters.

When, however, a ground fault has occurred, a determination is made as to whether oscillation on the system power bus is present. When bus oscillation is not detected, one or more of the PCGFP circuits are activated to isolate the fault at operation 512, and the method returns to operation 506 to continue monitoring the operating parameters of the system and PCGFP circuits.

When, however, oscillation on the bus is detected, the bus voltage is monitored and analyzed in real time (e.g., by controller 150) at operation 520, and the power amplified included in the system is invoked into a standby mode. At operation 518, determination is made (e.g., by controller 150) as to whether the bus voltage exceeds a voltage level threshold. When the bus voltage does not exceed the voltage level threshold, the power amplifier is activated and power is injected into the bus at operation 520. The power is generated from the ground fault energy stored by one or more of the PCGFP circuits. At operation 522, the bus voltage continues to be monitored after injecting the power, and a determination as to whether the oscillation is still present is performed at operation 524. When the oscillation is removed, the method returns to operation 506 and continues to monitor the parameters of the system and the PCGFP circuit. Otherwise, the method returns to operation 518 and continues to compare the bus voltage to the voltage level threshold to determine.

When the bus voltage exceeds the voltage level threshold at operation 518, the power amplifier is activated and power is drawn from the bus at operation 526. The energy from the drawn power can be stored in one or more energy storage devices included in the individual the PCGFP circuits. At operation 522, the bus voltage continues to be monitored after drawing the power from the bus, and a determination as to whether the oscillation is still present is performed at operation 524. When the oscillation is removed, the method returns to operation 506 and continues to monitor the parameters of the system and the PCGFP circuit. Otherwise, the method returns to operation 518 and continues to compare the bus voltage to the voltage level threshold to determine.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts and equivalents of all means or step plus function elements in the claims below are intended to include any structure, material or act for performing the function in combination with other claimed elements as claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While embodiments have been described, it will be understood that those skilled in the art, both now and in the future, may make various improvements and enhancements which fall within the scope of the claims which follow. These claims should be construed to maintain the proper protection for the invention first described.

What is claimed is:

1. A power converter having ground fault protection (PCGFP) circuit, the PCGFP circuit comprising:
   an input stage connected to a power bus and configured to receive an input direct current (DC) voltage having a first voltage level;
   a first voltage converter connected to the power bus and configured to convert the input DC voltage to a second voltage having a second voltage level different from the first voltage level, the first voltage converter including a plurality of solid-state switches configured to continuously switch between an open and closed state at a selected frequency so as to regulate power present on the power bus;
   an output stage connected to the power bus and including a second voltage converter circuit configured to rectify the second voltage to generate an output voltage having a different voltage level from the first level;
   a controller configured to control operation of the first and second voltage converters and to detect a ground fault on the power bus; and
   at least one fault energy recovery circuit in signal communication with one or both of the input stage and the output stage, the at least one fault energy recovery circuit configured to collect and store fault energy delivered in response to the ground fault on the power bus installed at one or both of the input stage and the output stage,
   wherein the controller operates one or both of the first voltage converter and the second voltage converter in a fault isolation mode in response to detecting the ground fault, and wherein one or both of the first voltage converter and the second voltage converter isolates the ground fault in response to operating in the fault isolation mode.

2. The PCGFP circuit of claim 1, wherein the at least one fault energy recover circuit comprises:
   a fault rectifier circuit configured to collect the fault voltage generated in response to the ground fault;
   a fault converter circuit configured to convert the fault voltage from a first fault voltage level to a second fault voltage level; and
   a fault energy storage device configured to store fault energy corresponding to the second fault voltage level, the fault energy storage device including an output in signal communication with the power bus.

3. The PCGFP circuit of claim 2, wherein the at least one fault energy recovery circuit is configured to inject the fault energy from the fault energy storage device to the power bus, or to draw energy from the power bus to the fault energy storage device.

4. The PCGFP circuit of claim 3, wherein the at least one fault energy recovery circuit includes a first energy recovery circuit in signal communication with the power bus at the input stage, and a second energy recover circuit in signal communication with the power bus at the output stage.

5. A power distribution system, comprising:
   a power amplifier electrically coupled to a power bus and configured to receive a DC input and to provide floating DC outputs to the power bus;
   at least one sensor configured to monitoring operating parameters of the power bus;
   at least one power converter having ground fault protection (PCGFP) circuit, the at least one PCGFP circuit configured to capture and store fault energy delivered in response to a ground fault on the power bus;
   a controller configured to operate the at least one PCGFP circuit in a normal mode to regulate power on the power bus, and a fault isolation mode to isolate the ground fault occurring on the power bus,
   wherein the controller is configured to determine an imbalance in the DC outputs based on the operating parameters, and in response to determining the imbalance the controller commands the at least one PCGFP circuit to at least one of inject the stored fault energy to the power bus and draw energy from the power bus.

6. The power distribution system of claim 5, wherein at least one of injecting the stored fault energy to the power bus and drawing energy from the power bus suppresses oscillation on the power bus.

7. The power distribution system of claim 6, wherein the controller compares the operating parameters to a threshold value, and injects the stored fault energy to the power bus in response to the operating parameters being equal to or less than a threshold value.

8. The power distribution system of claim 7, wherein the controller compares the operating parameters to the threshold value, and draws the energy from the power bus in response to the operating parameters exceeding the threshold value.

9. The power distribution system of claim 8, wherein the at least one PCGFP circuit includes at least one fault energy recover circuit comprising:
   a fault rectifier circuit configured to receive fault voltage in response to the ground fault;
   a fault converter circuit configured to convert the fault voltage from a first fault voltage level to a second fault voltage level; and
   a fault energy storage device configured to store fault energy corresponding to the second fault voltage level, the fault energy storage device including an output in signal communication with the power bus.

10. The power distribution system of claim 9, wherein the at least one fault energy recover circuit includes a first energy recover circuit electrically coupled to the DC input, and a second energy recover circuit electrically coupled to the floating DC outputs.

11. The power distribution system of claim 9, wherein the at least one PCGFP circuit includes a plurality of PCGFP circuits.

12. A method of interrupting an electrical ground fault, the method comprising:
   delivering, via a power bus, an input direct current (DC) having a first voltage level to an input stage;
   converting, via a first voltage converter connected to the power bus, the input DC voltage to a second voltage having a second voltage level different from the first voltage level;
   continuously switching a plurality of solid-state switches included with the first voltage converter including a plurality of solid-state switches so as to regulate power present on the power bus;
   rectifying, via an output stage connected to the power bus, the second voltage to generate an output voltage having a different voltage level from the first level; and
   detecting, via a controller, a ground fault on the power bus;
   collecting, via a fault energy recovery circuit in signal communication with one or both of the input stage and the output stage, fault energy delivered in response to the ground fault;
   storing the fault energy in an energy storage device; and
   operating one or both of the first voltage converter and the second voltage converter in a fault isolation mode in response to detecting the ground fault so as to isolate the ground fault.

13. The method of claim 12, further comprising:
   determining an electrical imbalance on the power bus; and
   one or both of injecting the fault energy from the energy storage device to the power bus and drawing energy from the power bus to the energy storage device.

14. The method of claim 13, wherein injecting the fault energy comprises:
   comparing operating parameters of the power bus to a threshold value; and
   injecting the stored fault energy to the power bus in response to the operating parameters being equal to or less than a threshold value.

15. The method of claim 14, wherein injecting the fault energy comprises:
   comparing the operating parameters the threshold value; and
   drawing the energy from the power bus in response to the operating parameters exceeding the threshold value.

* * * * *